United States Patent [19]

Tanaka et al.

[11] Patent Number: 4,504,934
[45] Date of Patent: Mar. 12, 1985

[54] OPTICAL SIGNAL REPRODUCING APPARATUS

[75] Inventors: Shinichi Tanaka, Kyoto; Ikuo Matsuda; Namio Hirose, both of Hirakata; Kazutsugu Kobayashi, Takatsuki, all of Japan

[73] Assignee: Matsushita Electric Industrial Co., Ltd., Osaka, Japan

[21] Appl. No.: 305,346

[22] Filed: Sep. 24, 1981

Related U.S. Application Data

[63] Continuation of Ser. No. 146,117, May 2, 1980, abandoned.

[51] Int. Cl.³ ............................................. G11B 11/18
[52] U.S. Cl. ..................................... 369/18; 369/100; 369/45
[58] Field of Search ................... 369/45, 46, 44, 100, 369/112, 119, 120, 122, 111, 101, 142, 18; 350/6.6, 6.7, 6.8; 250/201

[56] References Cited

U.S. PATENT DOCUMENTS

| 3,138,669 | 6/1964 | Rabinow | 369/18 |
| 3,798,386 | 3/1974 | Dickopp | 369/18 |
| 3,860,766 | 1/1975 | Mori | 369/18 |
| 3,932,700 | 1/1976 | Snopko | 369/18 |
| 3,992,593 | 11/1976 | Heins | 369/18 |
| 4,005,259 | 1/1977 | Kaneko | 250/570 |
| 4,037,929 | 7/1977 | Bricot | 369/45 |
| 4,163,149 | 7/1979 | Sawano | 250/204 |
| 4,193,091 | 3/1980 | Kleuters | 369/45 |
| 4,310,911 | 1/1982 | Fujishima | 369/44 |

FOREIGN PATENT DOCUMENTS

53-73209  1/1980  Japan .................................. 369/119

OTHER PUBLICATIONS

"Self-Coupled Optical Pickup" by Mitsuhashi et al., Optics Communications, vol. 17, No. 1, Apr. 1976.

*Primary Examiner*—Alan Faber
*Attorney, Agent, or Firm*—Wenderoth, Lind & Ponack

[57] ABSTRACT

In an optical signal reproducing apparatus for a conventional disc phonograph record, the groove of said record is irradiated with the light beam from a direction that varies cyclically at a constant frequency in a plane. Said plane includes both the tangential velocity vector of the groove and a normal line to the surface of the groove. At the moment that the light beam irradiates the surface of the groove from a perpendicular direction, the reflected light beam traces back the same path as that of the irradiating light beam. When a photo-detector is limited by a slit to detect only the reflected light beam tracing back the same path as the irradiating light beam, the photo-detector detects light pulses which are pulse-phase-modulated by the slope angle of the surface of the groove. The recorded signal can be reproduced by demodulating said pulse-phase-modulated pulses.

6 Claims, 7 Drawing Figures

OPTICAL SIGNAL REPRODUCING APPARATUS

This is a continuation of application Ser. No. 146,117, filed May 2, 1980, now abandoned.

BACKGROUND OF THE INVENTION

This invention relates to an optical signal reproducing apparatus, for a disc phonograph record, which will simply be called a record hereinafter.

Usual apparatus that reproduces signals from a record utilizes a stylus pickup. Inherent to this technique, there are many problems such as wear, distortion, and noise transients from scratches. An optical signal reproducing apparatus that reproduces signals with no contact to the record can avoid such problems. But, optical signal reproducing apparatus that have been proposed include new problems as follows. It is difficult to achieve high fidelity when a light beam irradiates the surface of the groove from a certain direction, because the signal that has been detected from variations of the reflected light beam is not proportional to the recorded signal. Besides in the apparatus which reproduces signals directly from the variations of the detected light, it is inevitable that the fluctuation in the reflexibility of the surface of the groove and the fluctuations in the intensity of the irradiating light beam produce noise.

SUMMARY OF THE INVENTION

Accordingly, it is the object of this invention to provide an optical signal reproducing apparatus for playing records with high fidelity and without wear and without noise from scratches.

According to this invention, a light source radiates a light beam which irradiates an optical scanner. Said optical scanner swings the light beam at a constant frequency to scan on the aperture of an objective lens. Said objective lens focuses the light beam into a small part on the surface of the groove, where the length of said small part is less than the wavelength of the recorded signals. In the way mentioned above, the light beam irradiates the small part on the surface of the groove from a direction that is varied cyclically at a constant frequency in a plane, where said plane includes both the tangential velocity vector of the groove and the a line normal to the surface of the groove.

The light beam is reflected from the surface of the groove. The direction of the reflected light beam varies with time, because the direction of the irradiating light beam is varied cyclically. During one swing time of the irradiating light beam, there is only on chance that the reflected light beam traces back the same path as the irradiating light beam. That happens when the light beam irradiates the surface of the groove from the perpendicular direction.

A photodetector is placed to detect only the reflected light beam that traces back the same path as that of the irradiating light beam. The time that the photodetector detects the reflected light beam depends on the slope angle of the surface of the groove in each sweep in the irradiating direction. The photodetector detects light pulses which are pulse-position-modulated by the slope angle of the surface of the groove. The slope angle is given by pulse-position-demodulation, and the slope angle can be transformed to reproduce the recorded signals. It is significant that this signal reproducing process is essentially linear.

The reflected light beam that passes the objective lens again is swung similarly to the irradiating light beam. A second lens converges the swinging reflected light beam. The swinging directions before and after the converging point are opposite to each other. The converging point by the second lens is displaced from the standard plane due to the focus error of the objective lens. Therefore, the focus error of the objective lens can be detected by sensing the swinging direction of the reflected light beam on the standard plane of the second lens. The focusing servo system controls the position of the objective lens by using the focus error signal detected by the way mentioned above.

As will be explained in greater detail in the following paragraphs, the optical signal reproducing apparatus of this invention has many important advantages over conventional phonographs and known optical signal reproducing apparatus.

BRIEF DESCRIPTION OF THE DRAWINGS

This invention will be described below with the aid of the accompanying drawings, in which.

DESCRIPTION OF PREFERRED EMBODIMENT

Basic system description

Figure 1:
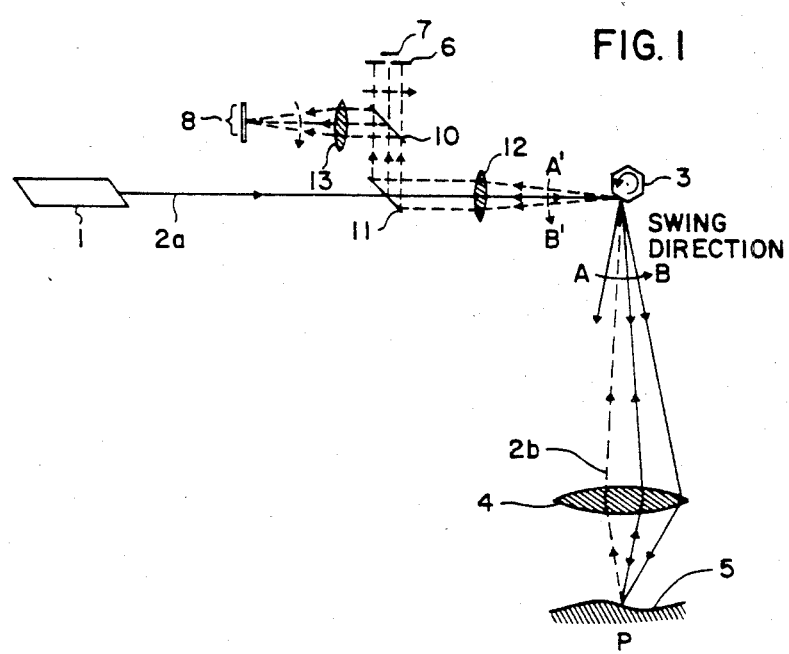
FIG. 1 is a schematic diagram for representation of one embodiment of this invention.

FIG. 1 is a schematic diagram for representation of one embodiment of this invention. A light source 1 is capable of radiating an irradiating light beam 2a. The irradiating light beam 2a shown by solid lines, is focused by a lens 12 on an optical scanner 3 which swings the irradiating light beam 2a at a constant frequency to scan on the aperture of an objective lens 4. As the irradiating light beam 2a is focused in a small part P on the surface of the groove 5, the irradiating light beam 2a irradiates the small part P from a direction which is varied cyclically at a constant frequency.

Then, the reflected light beam 2b, shown by dashed lines, is focused on the optical scanner 3 again by the objective lens 4. When the swinging direction of the irradiating light beam 2a varies from A to B, the direction of the reflected light beam 2b varies from A' to B'. After being reflected by a beam-splitter 11, the reflected light beam 2b falls on a slit 6 and scans on it. The slit 6 passes the reflected light beam only when the reflected light beam traces back the same path as that of the irradiating light beam 2a. Therefore, a photo-detector 7 senses a light pulse when the light beam 2a irradiates the surface of the groove 5 from the perpendicular direction because the reflected light beam traces back the same path only at that time. The slit 6 is not necessary when the active area of the photo-detector 7 is satisfactorily limited. In this way, the photo-detector 7 senses pulse signals modulated in pulse-phase-modulation (PPM) by the slope angle of the surface of the groove.

The recorded signals can be reproduced by demodulating the PPM signals.

The reflected light beam 2b is divided by a beam splitter 10. When the surface of the groove 5 is at the position of the focal plane of the objective lens 4, the reflected light beam 2b is focused on the boundary of a pair of photo-detectors 8 by a lens 13. In this case, the electric signals that appear at each of the pair of photo-detectors 8 are the same and do not include the scanning frequency, because the focused position is not displace. When the surface of the groove is displaced from the focused position, the converging point of the lens 13 is displaced from the surface of the pair of photo-detectors 8. This displacement causes the reflected light beam 2b to scan on the surface of the pair of photo-detectors 8 toward the direction which depends on the direction of the focus error of the objective lens 4. This means that the occurrence and the direction of the focus error of the objective lens 4 can be detected by comparing the phase of the signal sensed at the pair of photo-detectors 8 with the phase of swinging of the reflected light beam 2b.

Principle of reproducing signals

Figure 2:
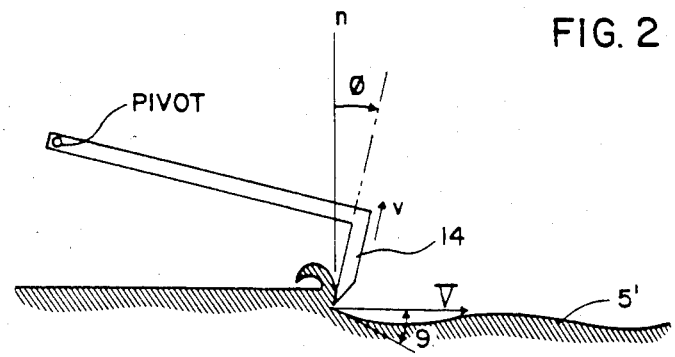
FIG. 2 is a schematic diagram for showing a cutting process to record signals on a conventional record.

FIG. 2 is a schematic diagram showing conventional cutting process to record signals on a master disc. The surface of the groove 5' is produced by a cutting needle 14 on the disc which is moving at a tangential velocity vector V. When the cutting needle 74 is vibrated by a recording signal at a recording velocity vector v, the slope angle $\theta$ of the surface of the groove shown in the diagram is described as follows:

$$\tan \theta = \frac{v \cos \phi}{V - v \sin \phi} \quad (1)$$

Here, $\phi$ is the so called cutting angle; the inclination of the needle 74 from the line n perpendicular to the surface of the groove 5'. Therefore, $$v = \frac{\tan \theta}{\sin \phi \cdot \tan \theta + \cos \phi} \cdot V \quad (2)$$

Thus the recording velocity v can be measured by detecting the slope angle $\theta$.

Figure 3:
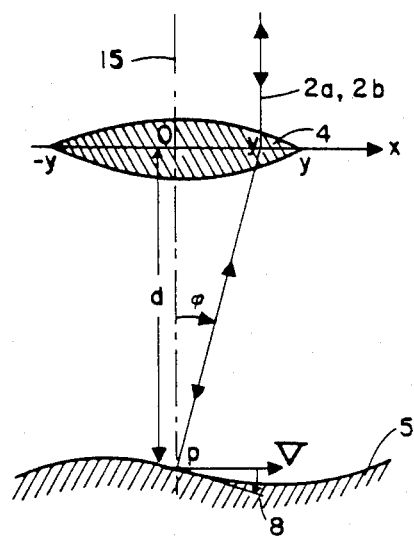
FIG. 3 is an expanded diagram around an objective lens in a particular condition to explain the principle of this invention.

At first, it is useful for explaining the principle of reproducing signals in this invention to essentially deal with the case when the angle $\phi$ is equal to zero. FIG. 3 is the expanded diagram around the objective lens 4 to explain the essential principle. Consider a coordinate system comprising the origin O on the principal point of the objective lens 4 and the x axis parallel to the tangential velocity vector V, as is shown in the diagram. The optical axis 15 of the objective lens 4 is perpendicular to the tangential velocity vector V. The distance between the origin O and the converging point P on the surface of the groove 5 is d. If the irradiating light beam 2a scans on the x axis linearly from $-r$ to $r$, the coordinate x where the irradiating light beam 2a crosses the x axis can be described as follows:

$$x = r(2t/\tau - 2[t/\tau + \tfrac{1}{2}]) \quad (3)$$

where [a] is Gaussian symbol which means the largest integer not greater than a, and t is time. Therefore, the angle $\psi$ of incidence with the irradiating light beam 2a can be described as:

$$\tan \psi = \frac{x}{d} = \frac{r}{d}(2t/\tau - 2[t/\tau + 1/2]) \quad (4)$$

If $\phi = 0$: Eq. (1) becomes, $$\tan \theta = \frac{v}{V} \quad (5)$$

The angle $\psi$ is equal to the angle $\theta$ at the time $t_o$ when the reflected light beam 2b from the point P traces back the same path as the irradiating light beam 2a. From Eq. (4) and (5), the following Eq. (6) is obtained.

$$v = \frac{r}{d}(2t/\tau - 2[t/\tau + \tfrac{1}{2}]) \cdot V \quad (6)$$

This means that light pulses detected at the time when the reflected light beam 2b traces back the same path as the irradiating light beam 2a are directly modulated in pulse position modulation (PPM) by the recording velocity v. Therefore, the recorded signals can be easily reproduced by PPM-demodulation. But the angle $\phi$ is not equal to zero and, in general, it is about 15 degrees and is called the cutting angle. The case that the cutting angle is set at a certain angle $\phi$ is explained below.

Figure 4:
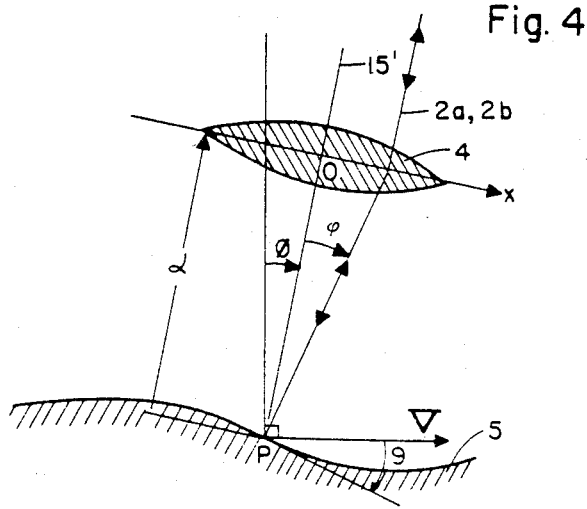
FIG. 4 is an expanded diagram around an objective lens in general condition to explain the utility in practical case.

FIG. 4 is an expanded diagram around the objective lens 4 of which optical axis 15' inclines at the same angle as the cutting angle $\phi$ as shown in FIG. 2. Consider a coordinate system which comprises the origin O on the principal point of the objective lens 4 and x axis as shown in FIG. 4. The x axis is perpendicular to the optical axis of the objective lens 4 and is in the plane including both the tangential velocity vector V and optical axis $\overline{Op}$. When the irradiating light beam 2a scans on the x axis, the angle $\psi$ of incidence with the irradiating light beam 2a can also be described by Eq. (4).

When $$\phi + \psi = \theta \quad (7)$$

the reflected light beam traces back the same path as the irradiating light beam 2a, and is detected by the photo-detector. From Eq. (1) and Eq. (7), $$\tan \psi = \tan(\theta - \phi) \quad (8)$$

$$= \frac{1}{V \cos \phi} v - \tan \phi$$

Therefore, $$v = \cos\phi \cdot \left\{ \frac{r}{d}(2t_o/\tau - 2[t_o/\tau + \tfrac{1}{2}]) + \tan\phi \right\} \quad (9)$$

where $t_o$ is the time when the light pulse is detected. Eq. (9) means that the signal recorded at the velocity v can be reproduced by PPM-demodulation.

In this principle mentioned above, the light source is not limited to be of a specific kind. However, a laser oscillator is recommended as the light source, because a laser beam can be focused satisfactorily into a small area by a simple optical system. Especially, a laser diode is useful not only for the light source but also for the photo-detector, because a laser diode is capable of photo-detection by use of the so called self-coupling effect.

Focus error detection

Figure 5:
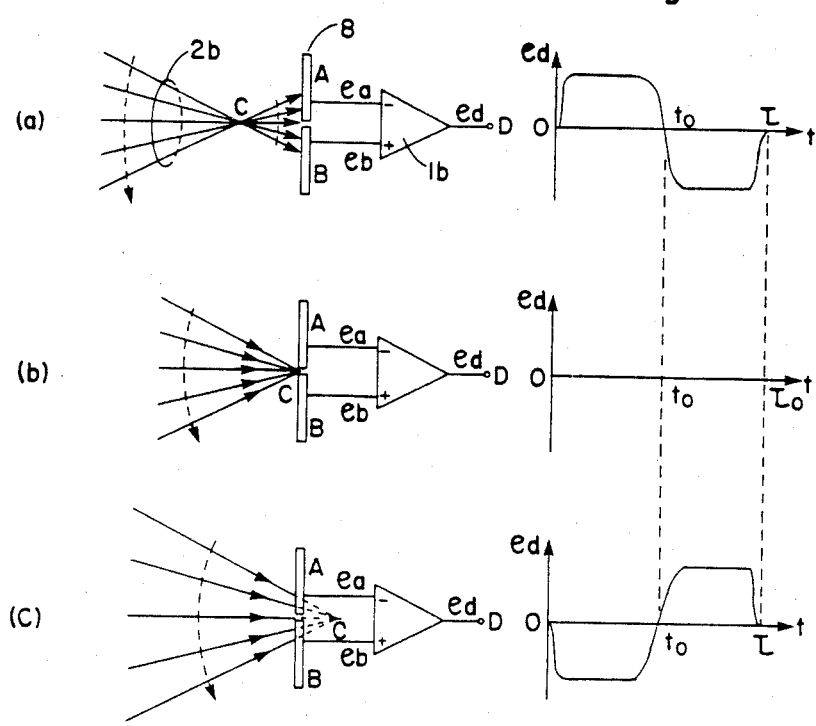
FIGS. 5a–5c are an expanded diagrams around a pair of photo-diodes to explain the principle of focus detection.

FIGS. 5a–5c are expanded diagrams around the pair of photo-detectors 8 which consists of two parts, A and B. The reflected light beam 2b is converged in a point C by the lens 13, not shown in these diagram. The pair of photo-detectors 8 is so placed that the boundary of these photo-detectors coincides with the converging point C when the objective lens 4 is at the just focused position. This is shown in FIG. 5b. The pair of photo-detectors 8 transform the reflected light beam 2b to the electric signal $e_a$ and $e_b$. The differential amplifier 16 subtracts the signal $e_a$ from the signal $e_b$, and its difference signal $e_d$ appears at the terminal D. In the case when the surface of the groove goes away from the objective lens and slips off the just focused position, the converging point C moves from the surface of the pair of photo-detectors 8 toward the front direction thereof as shown in FIG. 5a. In this case, the difference signal appears like the pattern described in the right part of FIG. 5a, when the reflected light beam 2b is swept to the direction of dashed arrows during the time $0 \leq t \leq \tau$, where $\tau$ is the cycle-time of sweeping.

FIG. 5c shows the opposite case. In this case, the surface of the groove is too close to the objective lens, and the converging point C moves to the back side of the pair of photo-detectors 8. The sweeping direction of the reflected light beam 2b on the pair of photo-detectors 8 is opposite to that in FIG. 5a, and the signal at D is also opposite in sign to that in FIG. 5a. Therefore, the focus error signal can be obtained from the difference signal $e_d$. In practice, the focus error signal can be obtained by using one of the following three conversion methods.

(i) Integrate the difference signal $e_d$ during only $0 \leq t \leq t_o$ or $t_o \leq t \leq \tau$.

(ii) Invert the sign of the difference signal $e_d$ during $0 \leq t \leq t_o$ or $t_o \leq t \leq \tau$, and then integrate that partially inverted signal all through the time.

(iii) Integrate the difference signal $e_d$ during $0 \leq t \leq t_o$ to make one signal and during $t_o \leq t \leq \tau$ to make another signal, and then subtract one of these signals from the other.

All these three signals integrated in the way mentioned above represent the split of the surface of the groove from the just focused position. Any one of these three signals can be used to control the position of the objective lens at the just focused position. This can be achieved by using a servo system that controls the position of the objective lens to minimize the integrated signal.

What is claimed is:

1. An optical signal reproducing apparatus, said apparatus reproducing signals stored in a groove in which signals have been recorded, said apparatus comprising: a light source for radiating a light beam; an objective lens for converging said irradiating light beam into a small area on the surface of said groove in which signals have been recorded; an optical scanner for scanning said irradiating light beam on said objective lens at a selected frequency so as to vary the direction in which said irradiated light beam is incident toward said small area; and a photo-detector for detecting the reflected light beam from said surface of said groove only when said reflected light beam traces back a path which is the same as that of said irradiating light beam and for producing a signal which is a reproduction of said signals stored in said groove.

2. An apparatus according to claim 1, wherein said light source comprises a laser oscillator.

3. An apparatus according to claim 2, wherein said laser oscillator and said photodetector together comprise a laser diode which detects said reflected light beam by means of the self-coupling effect.

4. An apparatus according to claims 1 or 2 or 3, further comprising a pair of photo-detectors adjacent to each other, each generating an output signal dependent upon the intensity of light beams irradiated on the boundary theof; a lens for converging said reflected light beam on the boundary of said pair of photo-detectors and means for producing focus error signals from the difference between said output signals generated by said pair of photo-detectors.

5. An optical signal reproducing apparatus, said apparatus reproducing signals stored in the slope angle of a groove on a rotating disc, wherein said apparatus comprises:

a light source for radiating a beam of light;
a converging lens and an objective lens and an optical scanner, said converging lens converging said light beam from said light source on the surface of said scanner and said scanner scanning said converged light beam on said objective lens at a selected frequency and said objective lens converging said light beam on the surface of said groove in which signals have been recorded, wherein the direction in which said converged light beam is incident toward said surface of said groove is varied;
and a photo-detector for detecting the reflected light beam from said surface of said groove only when said reflected light beam traces back a path which is the same as that of said irradiating light beam, wherein said photo-detector produces a pulse phase modulated signal which is demodulated by a demodulator means so as to generate a reproduction of said signals stored in the slope angle of said groove.

6. An optical signal reproducing apparatus, said apparatus reproducing signals stored in the slope angle of a groove on a rotating disc, wherein said apparatus comprises:

a light source for radiating a beam of light;
a converging lens and an objective lens and an optical scanner, said converging lens converging said light beam from said light source on the surface of said scanner and said scanner scanning said converged light beam on said objective lens at a selected frequency and said objective lens converging said light beam on the surface of said groove in which signals have been recorded;
and a photo-detector for detecting the reflected light beam from said surface of said groove only when said reflected light beam traces back a path which is the same as that of said irradiating light beam, wherein said photo-detector produces a pulse phase modulated signal which is demodulated by a demodulator means to generate a reproduction of said signals stored in the slope angle of said groove;
further comprising: a beam splitter and a pair of adjacent photo-detectors, said beam splitter reflecting a portion of the light beam reflected from said surface of said groove onto said pair of photo-detectors, each of said pair of photo-detectors generating an output signal dependent upon the intensity of light beam irradiating on the boundary thereof;

a third lens arranged in the light path between said beam splitter and said pair of photo-detectors for converging said reflected light beam from said beam splitter on to said boundary of said pair of photo-detectors;

and means connected to said pair of photo-detectors for producing focus error signals responsive to the difference between said output signals generated by said pair of photo-detectors.

* * * * *